Oct. 28, 1969     D. O. EASTERLY     3,475,090

CONTROL DEVICE FOR ELECTRIC DRIVE MOVIE CAMERAS

Filed June 28, 1967     2 Sheets-Sheet 1

DONALD O. EASTERLY
INVENTOR.

BY *James A. Smith*
*Robert W. Hampton*

ATTORNEYS

Oct. 28, 1969  D. O. EASTERLY  3,475,090
CONTROL DEVICE FOR ELECTRIC DRIVE MOVIE CAMERAS
Filed June 28, 1967  2 Sheets-Sheet 2

DONALD O. EASTERLY
INVENTOR.

BY James A. Smith
Robert W. Hampton
ATTORNEYS

# United States Patent Office 3,475,090
Patented Oct. 28, 1969

3,475,090
CONTROL DEVICE FOR ELECTRIC DRIVE MOVIE CAMERAS
Donald O. Easterly, Rochester, N.Y., assignor to Eastman Kodak Company, Rochester, N.Y., a corporation of New Jersey
Filed June 28, 1967, Ser. No. 649,614
Int. Cl. G03b 1/00
U.S. Cl. 352—174
10 Claims

ABSTRACT OF THE DISCLOSURE

A control mechanism for an electrically driven motion picture camera is arranged such that one end of a drive shaft protruding from the electric drive motor is connected to gears for driving the shutter. The opposite end of the drive shaft has a pinion which meshes with a rack. Mounted on the shutter shaft adjacent to one end of a plate containing the rack is a cam such that a projection from the plate abuts the cam to prevent rotation of the shutter. Also near the same end of the plate are contacts for closing the circuit to the drive motor. When the start button is manually pressed, the contacts are closed and the motor, by means of the rack and pinion, drives the plate away from the cam to allow rotation of the shutter. As the start button is manually pressed, the rack rotates the pinion and provides a positive start for the motor.

BACKGROUND OF THE INVENTION

Field of the invention

The present invention relates to electric drive motion picture cameras and more particularly to control means in such a camera for coordinating automatically the operation of the camera motor and the brake mechanism employed to retain the camera shutter in its closed position when the camera is not in operation.

Description of the prior art

To prevent unwanted exposure of the film in a motion picture camera, it is well known to provide the camera with means for insuring that the shutter will remain in a closed position whenever a picture sequence is not being taken. In cameras operated by spring motors, this is customarily accomplished by mechanically blocking the shutter in a closed position to interrupt the operation of the camera and subsequently releasing the shutter to allow such operation to proceed. In electric drive cameras, however, mechanical brake means employed to block and release the shutter must be accompanied by switch means for opening and closing the electric motor circuit in coordination with the operation of the brake means in order to prevent drainage of the battery or other power source while the camera is not in use. Typically, this is accomplished by a control device which closes the motor switch and then releases the shutter in response to progressive manual movement of a push button or similar operating member, with means also being provided to prevent the shutter from stopping other than in a closed position when the push button is moved in the opposite direction to open the switch and re-engage the shutter with the brake device.

Since a control device of the type described above releases the shutter brake only when the push button is moved beyond the position in which it closes the motor switch, it is possible for the operator to move the button just far enough to close the switch but not quite far enough to completely release the brake. This may result in an annoying phenomenon referred to as "machine gunning" in which a chattering effect is produced by the energized motor attempting to drive the shutter against the resistance of the brake.

One known means for preventing such "machine gunning" is to provide a spring-loaded toggle mechanism in the control device, which causes the switch and the brake to operate simultaneously when the push button is moved past a predetermined position. In order to operate satisfactorily, however, such an arrangement must employ relatively stiff spring means in the toggle mechanism, thereby producing undesirably violent operation of the switch and brake mechanisms and/or requiring the operator to exert a substantial pressure on the push button to operate the camera. Accordingly, the present invention contemplates performing the above-described function by means of a simple and reliable control device whereby movement of the push button starts the motor, which, in turn, causes the shutter brake to releases and remain inoperative during the operation of the camera. Thus, since the motor itself serves to disengage the shutter brake, it is apparent that this arrangement eliminates entirely the above-described machine-gunning annoyance and positively insures the required opearting sequence of the switch and brake means.

Another relatively infrequent but nevertheless annoying occurrence experienced with known electric drive cameras is that the motor may occasionally fail to start when the push button is operated if the commutator of the motor happens to be at the exact position in which a particle of dust or other foreign material thereon insulates it from the adjacent contact brush. To eliminate this problem, a preferred embodiment of the present invention also includes means whereby movement of the push button imparts manual rotation to the motor shaft as the switch is closed to insure that localized contamination of the commutator cannot prevent the motor from starting.

SUMMARY OF THE INVENTION

Briefly stated, the present invention provides a motion picture camera including an electric motor adapted when energized to drive a shutter member, brake means adapted to releasably engage the shutter member to prevent movement thereof, means for energizing the motor, and brake release means driven by the motor upon energization thereof to release the shutter member from engagement with the break means.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because certain parts of cinematographic and related apparatus are well known, the following description is directed in particular to those elements forming, or cooperating directly with, the present invention, elements that are not specifically shown or described herein being understood to be selectable from those known in the art.

Figure 1:
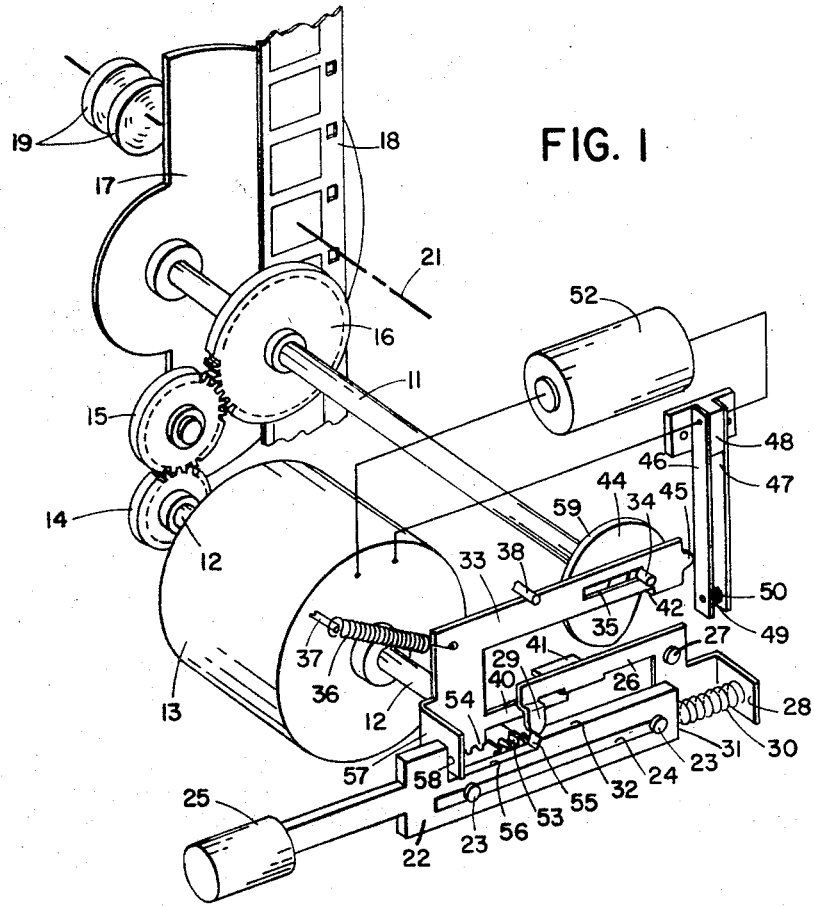
FIG. 1 is a somewhat schematic perspective rear view of a camera control device according to a preferred embodiment of the invention, showing the subject device in conjunction with the cooperating elements of a electrically powered motion picture camera.

As shown in FIG. 1, a camera embodying the present invention comprises a rotatably supported shaft 11 connected to motor shaft 12 of electric motor 13 through a gear train comprising motor gear 14, idler gear 15 and shaft gear 16. A shutter blade 17 is attached to shaft 11 near its forward end and is thereby adapted to be rotated in a clockwise direction by corresponding rotation of the motor shaft when the motor is running. All references herein to directions of movement or to the relative positions of various components are made from the viewpoint of the accompanying drawings. Thus, the rotating shutter blade is interposed intermittently between the film strip 18 within the camera and the camera lens system 19, located forwardly of the shutter blade along the optical axis indicated by broken line 21, to expose successive frames along the film as it is advanced intermittently in timed relation to the rotation of the shutter blade by conventional means, not shown.

The control device includes a slide member 22 slidably supported by studs 23 attached to a stationary member of the camera and extending through an elongate slot 24. An operating member in the form of a push button 25 is attached to one end of the slide member and extends through an opening in the camera housig, not shown, so that the push button is accessible to the camera operator. A latch member 26 is pivotally attached to the camera frame by a pivot stud 27 and includes a rearwardly bent ear 28 and a depending tongue 29 directly above the slide member. A relatively strong coil spring 30 is compressed between ear 28 of the latch member and the adjacent end surface 31 of the slide member to bias the slide member toward its extreme left position, as shown in FIGS. 1 and 2, while also urging the latch arm in a counterclockwise direction to maintain tongue 29 in contact with the adjacent raised upper surface 32 of the slide member.

Forwardly of the slide and latch members, a rack plate 33 is pivotally and slidably supported by a stationary stud 34 extending through slot 35. A relatively weak tension spring 36 connects the rack plate to a fixed pin 37 to bias the rack plate angularly to the position shown in FIGS. 1 and 2, defined by the engagement of stud 34 with the right end of slot 35 and by the abutment of the top edge of the plate against stationary abutment pin 38.

Figure 2:
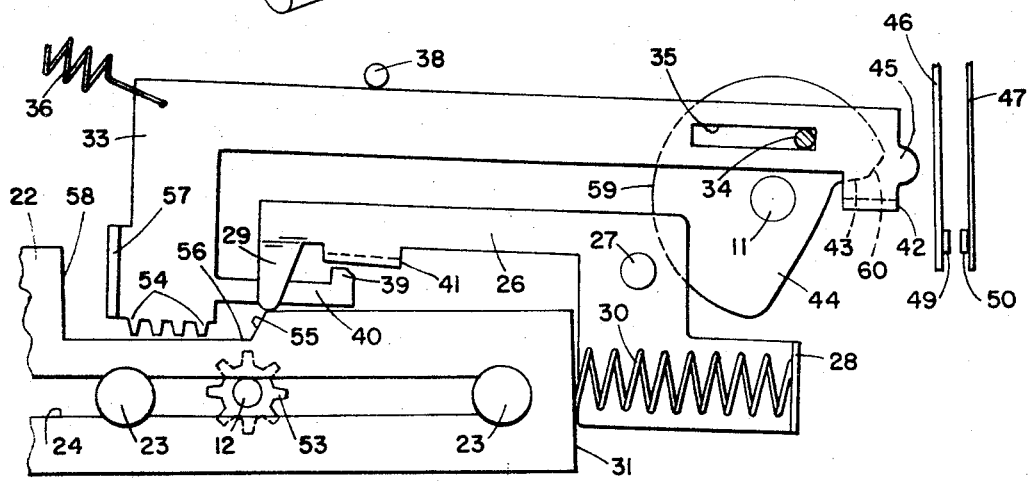
FIG. 2 is an enlarged elevational view corresponding to a portion of FIG. 1 showing the depicted components of the subject device in the respective positions assumed thereby when the camera is not in operation.

When the above-mentioned components of the central device are positioned as shown in FIGS. 1 and 2, as explained above, latch tooth 39 extending upwardly from arm 40 of the slide plate is spaced directly below the lower surface of latch ear 41 projecting forwardly from the slide member. Also, a shutter brake arm 42, extending forwardly from the rack plate, is spaced slightly below, but in engageable alignment with, radial edge surface 43 of brake cam 44 affixed to the adjacent end of shaft 11. Accordingly, shaft 11 can rotate in a clockwise direction through only a small angle before being blocked, such movement being insufficient to move the shutter blade out of its illustrated position in which it is aligned with the lens system, i.e., in which the shutter is closed. Furthermore, it will be seen that the rounded lug 45 at the same end of the latch plate is spaced from flexible switch strap 46 of a normally open electric switch comprising that strap and a similar strap 47, such straps being supported by insulating block 48 with their respective contact points 49 and 50 out of contact with each other. Thus, since the switch is connected in series with motor 13 and battery 52, the motor circuit remains open as long as the switch contacts are spaced apart and is closed to energize the motor when the contacts are in engagement.

At the rearward end of motor shaft 12, a pinion 53 is attached to the shaft adjacent to a rack segment 54 comprising a series of gear teeth defined by the rack plate, such teeth being positioned to the left of the pinion and raised out of horizontal alignment therewith while the push button is in its extended position.

Figure 3:
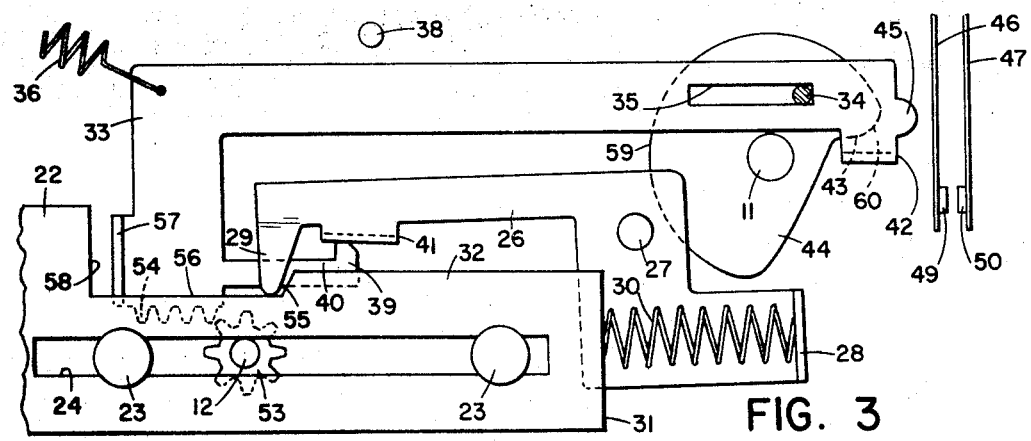
FIGS. 3 through 5 correspond to FIG. 2 and show respectively the positions of the depicted components during successive stages of movement of the push button as it is depressed to operate the camera.
Figure 4:
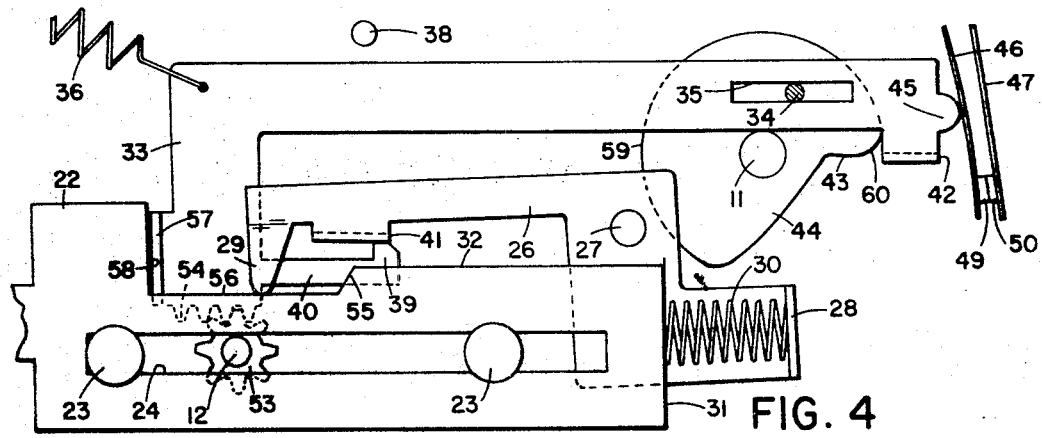
Figure 5:
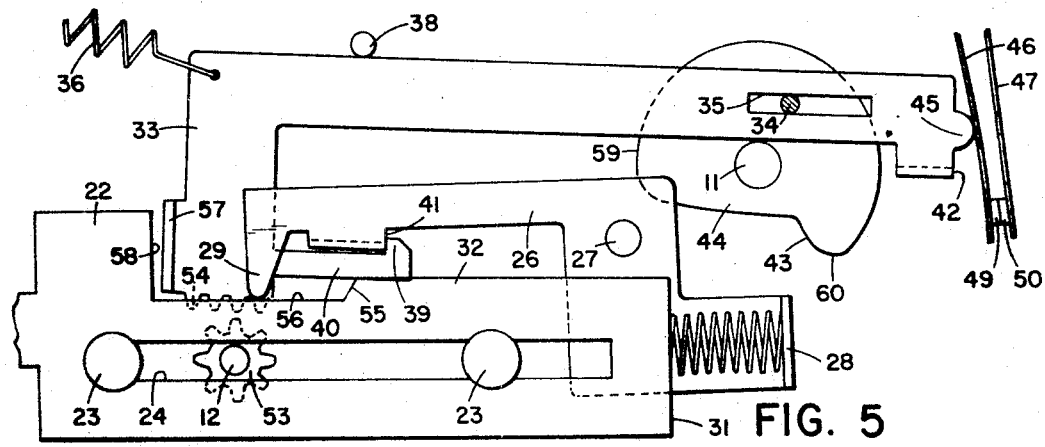

As the push button is depressed to operate the camera, the slide member moves to the right from the position shown in FIGS. 1 and 2, progressively past the positions shown in FIGS. 3 and 4, and to the position shown in FIG. 5. During the initial stage of such movement, the raised upper surface 32 of the slide member moves past tongue 29 of the latch member, as shown in FIG. 3, allowing the tongue to slide downwardly along intermediate edge surface 55 under the influence of spring 30 and into engagement with lower edge surface 56. Such pivotal movement of the latch arm moves latch ear 41 downwardly against latch tooth 39 on arm 40 to depress rack segment 54 into horizontal alignment with the uppermost teeth of pinion 53 against the influence of spring 36. At this stage of movement of the operating member, it should be noted that the rack plate has pivoted about stationary stud 34, but is still positioned with lug 45 spaced from switch strap 46 and with brake arm 42 in blocking relation to cam 44. However, as the push button is depressed further to move the operating member progressively to the subsequent position shown in FIG. 4, a rearwardly projecting abutment ear 57 on the rack plate is engaged by a vertical edge surface 58 on the operating member, whereby the rack plate is moved manually to the right to displace brake arm 42 beyond cam 44 and to cause the motor to be energized as lug 45 flexes the switch straps to establish firm contact between the adjacent contact points 49 and 50. During such movement of the rack plate, the rack segment thereof is meshed with pinion 53 while maintained in its lowered position by the abutment of latch ear 41 against the top of latch tooth 39, thereby manually rotating the motor shaft in a clockwise direction. Since the motor shaft is geared directly to shaft 11, such manual rotation of the motor shaft simultaneously rotates cam 44, which therefore must have its radial edge surface 43 initially spaced from shutter brake arm 42 to accommodate such rotation of the cam as the brake arm is withdrawn.

As soon as the contact points close, the motor will normally start to run in a clockwise direction. However, if the commutator happens to be in a position in which it is not in good contact with one of the brushes at the instant the switch is closed, further depression of the push button will rotate the commutator slightly to a position in which both brushes establish contact with the commutator to allow the motor to start.

When the motor begins to run, either the instant the switch closes or after being rotated manually thereafter, the clockwise rotation of the pinion now drives the rack plate further toward the right, moving it out of engagement with surface 58 of the slide member as the latter is moved further to the right. During such further movement of the rack member by the motor, latch tooth 39 is moved beyond latch ear 41, whereupon spring 36 raises the adjacent end of the rack plate to disengage rack segment 54 from pinion 53 and to raise the latch tooth into latched relation with the adjacent edge of latch ear 41, thus allowing the camera to continue to operate as long as the button remains depressed.

If, by chance, the motor torque is insufficient to displace the rack plate 33 in the manner described above, more annual rotation of the motor will position the rack plate 33 to the latching position thereof. Failure of the motor to start after the rack plate has been latched indicates that the batteries are too weak to operate the motor or that a malfunction exists.

When the push button is released to terminate an exposure sequence, spring 30 moves the slide member to the left toward its initial position shown in FIGS. 1 and 2. During such movement of the slide member, the rack plate and latch arm remain in their respective positions shown in FIG. 5 until the sloped intermediate edge surface 55 of the slide member engages tongue 29 and cams the tongue upwardly and onto the upper edge surface 32 against the counterclockwise force exerted on the latch member by spring 30, thereby lifting latch ear 41 out of engagement with latch tooth 39, as the latter is prevented from moving upwardly by the engagement of the rack plate with abutment pin 38. As soon as the tooth is thus disengaged from the latch arm, spring 36 slides the rack plate to the left toward its initial position, during which movement brake arm 42 moves into blocking engagement with the cam to block the shutter in a closed position as the motor switch is opened by movement of lug 45 out of engagement with switch strap 46. If the outer peripheral surface 59 of the cam happens to be aligned with the shutter brake arm 42 when the latch member is so released, the brake arm will engage that surface before lug 45 has moved sufficiently to open the motor switch. Therefore, the motor will continue to drive the shutter until the radial edge surface of the cam has moved past the brake arm, whereupon the latch member will return to its original position to open the motor switch and to block the cam with the shutter in a closed position, thus restoring all of the illustrated camera elements to their respective positions illustrated in FIGS. 1 and 2.

As previously mentioned, when the operation of the camera has been terminated, the radial edge surface 43 of the cam is spaced from the brake arm by a sufficient edge distance to allow partial manual rotation of the motor shaft by the rack member, such spacing being provided simply by the inherent rebounding of the cam when its radial edge surface strikes the shutter brake arm. Also, it should be noted that the cam is provided with a sloped edge surface 60 between its respective radial and peripheral surfaces 43 and 59. This sloped edge surface is adapted to prevent possible blocking of the shutter with the motor still energized, which might otherwise occur if the radial cam surface directly joined the peripheral surface and thereby defined a corner that could be engaged by the adjacent corner of the brake arm to block the cam without allowing the rack member to move sufficiently to open the motor switch. In other words, if the rack member is released just when the radial edge of the illustrated rotating cam is aligned with the abutment surface of the brake arm, the brake arm will be engaged by sloped cam surface 60 and thereby cammed back onto the peripheral surface 59 to allow the shutter to complete another revolution before the brake arm is free to move into positive blocking alignment with the radial cam surface 43.

From the foregoing explanation, it should be apparent that the present invention provides a simple and reliable control device for an electric movie camera, which positively effects proper sequential operation of the electric drive motor and the shutter braking means to insure that the shutter is closed and the electric circuit is open whenever the camera is not being operated, while at the same time eliminating the possibility of the motor failing to start if its commutator happens to be in a particular position in which it is not in positive electrical contact with one of the motor brushes.

The invention has been described in detail with particular reference to the preferred embodiment thereof, but it will be understood that variations and modifications can be effected within the spirit and scope of the invention.

I claim:

1. A motion picture camera including:
   (a) an electric motor adapted when energized to drive a shutter member,
   (b) brake means adapted to relesably engage said shutter member to prevent movement thereof,
   (c) means for energizing said motor, and
   (d) brake release means driven by said motor upon energization thereof to release said shutter member from engagement with said brake means.

2. In a motion picture camera including an electric motor adapted when energized to drive a shutter member alternately between open and closed positions, the improvement comprising:
   (a) switch means movable between conductive and non-conductive positions to respectively energize and deenergize said motor,
   (b) brake means operatively engageable with said shutter to arrest movement thereof in a closed position,
   (c) a manually movable operating member movable between a first position and a second position,
   (d) brake actuating means for operatively energizing said brake means with said shutter whenever said operating member is in said first position,
   (e) switch operating means for moving said switch to said non-conductive position whenever said operating member is in said first position and to said conductive position in response to movement of said operating member toward said second position, and
   (f) brake disabling means driven by said motor upon energization thereof to operatively disengage said brake means from said shutter.

3. The invention defined by claim 2 in which said brake disabling means comprises:
   (a) a pinion connected to said motor for rotation thereby,
   (b) a movable brake disabling member including gear teeth adapted to mesh with said pinion,
   (c) means for meshing said gear teeth with said pinion while said motor is deenergized to effect movement of said brake disabling member by said pinion when said motor is energized,
   (d) means responsive to movement of said brake disabling member by said pinion for disengaging said brake means from said shutter, and
   (e) means for automatically separating said gear teeth from meshing relation with said pinion upon disengagement of said brake means from said shutter.

4. The invention defined by claim 3 including:
   (a) latch means for releasably retaining said brake means out of engagement with said shutter,
   (b) means for maintaining said switch means in said conductive position while said brake means is out of engagement with said shutter,
   (c) means responsive to movement of said operating member back to said first position for releasing said latch means to arrest movement of said shutter by re-engagement of said brake means therewith, and
   (d) means for moving said switch means to said non-conductive position as movement of said shutter is arrested by such re-engagement of said brake means therewith.

5. An electrically driven camera including:
   (a) an electric motor including a motor shaft adapted to be electrically driven in a predetermined rotational direction to drive a shutter member alternately between open and closed positions,
   (b) a normally open switch adapted when closed to connect said motor to a source of electric energy to effect such electrically driven rotation of said shaft,
   (c) a manually displaceable operating member,
   (d) motor starting means engageable with said shaft to translate manual displacement of said operating member into rotative movement of said shaft,
   (e) means for closing said switch while said shaft is being rotatively moved by manual displacement of said operating member, and
   (f) means responsive to electrically driven rotation of said shaft for disengaging said motor starting means from said shaft.

6. The invention defined by claim 5 including:
   (a) brake means adapted to maintain said shutter in a closed position, and
   (b) means responsive to electrically driven rotation of said shaft for disabling said brake means in predetermined timed relation with the disengagement of said motor starting means from said shaft.

7. In a motion picture camera provided with an electric motor including a shaft rotatable in a predetermined direction to drive a shutter member alternately between open and closed positions when said motor is connected to a source of electric energy, the improvement comprising:
  (a) an operating member movable manually in a first direction against a resilient force urging said operating member in an opposite second direction,
  (b) a pinion attached to said shaft,
  (c) a rack member movable between first and second positions and including a plurality of gear teeth adapted to mesh with said pinion,
  (d) means responsive to initial movement of said operating member in said first direction for meshing said gear teeth with said pinion and for engaging said operating member with said rack member to move the latter from said first position toward said second position as said operating member is manually moved further in said first direction, whereby said rack member effects manual rotation of said shaft in said predetermined direction,
  (e) means on said rack member adapted to engage and close said switch during such manual movement of said rack member, whereby said pinion is rotated in said predetermined direction by said motor to complete the movement of said rack member to said second position,
  (f) a brake member adapted to operatively engage said shutter to retain the same in a closed positon, and
  (g) means for releasing said brake member from said shutter and separating said gear teeth from said pinion in response to movement of said rack member to said second position by said motor.

8. The invention defined by claim 7 in which said rack member is pivotally movable to engage and disengage said gear teeth and said pinion and slidably movable between said first and second positions.

9. The invention defined by claim 7 including:
  (a) latch means for releasably retaining said rack member in said second position,
  (b) resilient means biasing said rack member toward said first position,
  (c) latch release means for releasing said rack member in response to movement of said operating member in said second direction to allow movement of said member from said second position to said first position by said resilient means, and
  (d) means for maintaining said gear teeth out of engageable relation with said pinion during movement of said rack member from said second position to said first position by said resilient means.

10. The invention defined by claim 9 in which said latch means comprises a pivotally supported lever resiliently biased toward latching engagement with said rack member and movable out of such engagement with said rack member by cam means on said operating member engageable with said lever as said operating member completes its movement in said second direction.

References Cited
UNITED STATES PATENTS

| | | | |
|---|---|---|---|
| 1,006,406 | 10/1911 | Roebuck | 352—154 |
| 2,009,532 | 7/1935 | Taylor | 352—152 |
| 3,397,937 | 8/1968 | Schrader | 352—179 X |

NORTON ANSHER, Primary Examiner

M. H. HAYES, Assistant Examiner

PO-1050
(5/69)

UNITED STATES PATENT OFFICE
CERTIFICATE OF CORRECTION

Patent No. 3,475,090           Dated October 28, 1969

Inventor(s) Donald O. Easterly

It is certified that error appears in the above-identified patent and that said Letters Patent are hereby corrected as shown below:

Column 2, line 17, "releases" should be --release--.

Column 3, line 28, "housig" should be --housing--.

Column 5, line 70, "relesably" should be --releasably--.

Column 8, line 13, --rack-- should be inserted between "said" and "member".

SIGNED AND
SEALED
JUN 9 1970

(SEAL)
Attest:

Edward M. Fletcher, Jr.
Attesting Officer

WILLIAM E. SCHUYLER, JR.
Commissioner of Patents